Nov. 25, 1952    J. L. MATHENY ET AL    2,619,376
WINDSCREEN FOR AUTOMOBILES
Filed Nov. 8, 1949

INVENTORS
James L. Matheny
and Richard H. Perkins
BY
Stedman B. Hoar
Agent

Patented Nov. 25, 1952

2,619,376

UNITED STATES PATENT OFFICE 2,619,376

WINDSCREEN FOR AUTOMOBILES

James L. Matheny and Richard H. Perkins, Santa Ana, Calif.

Application November 8, 1949, Serial No. 126,128

3 Claims. (Cl. 296—84)

This invention relates to a windscreen for automobiles, and more particularly relates to a device for deflecting wind from the driver and passengers of automobiles of the type generally known as "convertible," in that such automobiles have tops which may be raised or lowered to convert them into closed vehicles or open vehicles.

It is an object of this invention to provide a windscreen or deflector for a convertible automobile which will deflect the air passing over the conventional windshield of such a vehicle from occupants of the vehicle when the top of said vehicle is in lowered position.

Another object of the invention is to provide a windscreen for a convertible automobile which does not interfere with the normal processes of raising and lowering the automobile top.

A further object of the invention is to provide a windscreen for a convertible automobile which may also serve as a shelf for storage of small articles when the automobile top is in raised position.

A general object of the invention is to provide a windscreen which is attractive in appearance, simple to operate, easily manufactured and installed, and particularly adapted for use with the V-type windshields of modern automobiles.

With these and other objects in view which will become apparent as the following description of our invention proceeds, we have embodied our invention as shown in preferred form in the accompanying drawing, in which.

Figure 1:
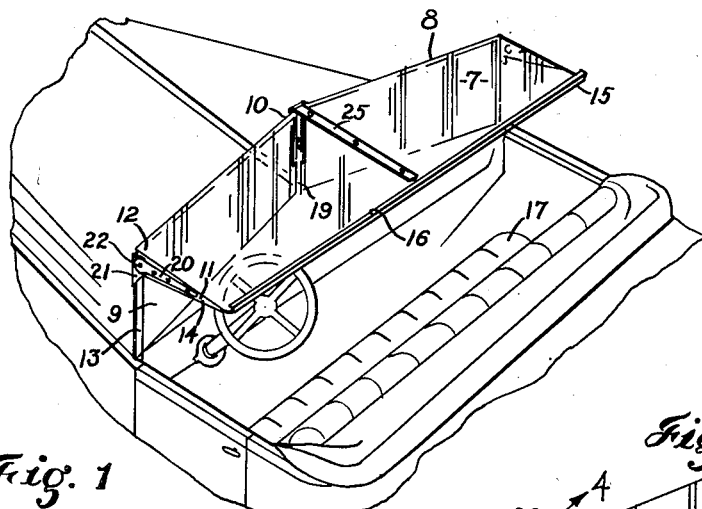
Figure 1 is a perspective view of the windshield and driver's seat portion of an automobile of open or convertible type, showing a windscreen embodying the principles of our invention installed on the windshield.
Figure 2:
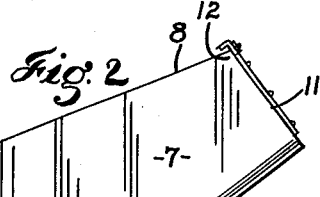
Figure 2 is a top plan view of the windscreen detached from the automobile.
Figure 3:
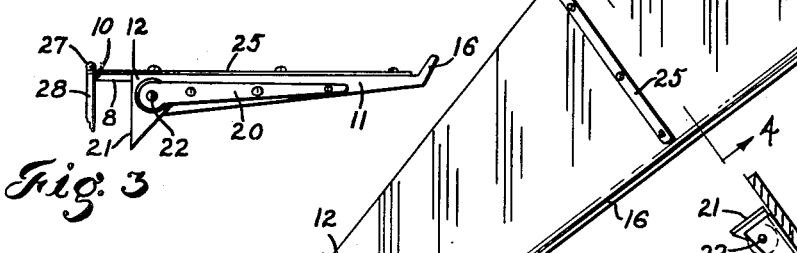
Figure 3 is a side elevation of the windscreen on a slightly enlarged scale.
Figure 4:
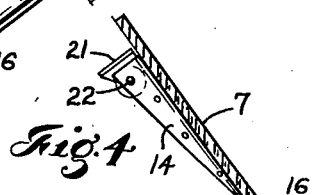
Figure 4 is a sectional view taken on the line of section 4—4 of Figure 2 and slightly enlarged, with the direction of view as indicated by the arrows.
Figure 6:
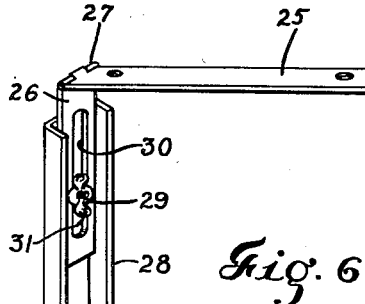
Figure 6 is a perspective view, on like scale, of mechanism for fastening the center portion of the windscreen to a center post of the windshield.
Figure 5:
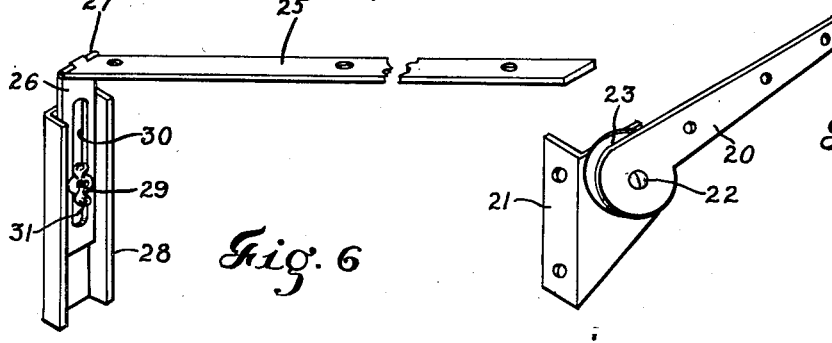
Figure 5 is a perspective view, on a further enlarged scale, of mechanism for attaching a side margin of the windscreen to a corner-post of the windshield.

Having reference now to the details of the drawings, we have provided a windscreen of which the principal component is a single sheet 7, of transparent material such as the plastic commonly known as Plexiglas. The sheet 7 has a forward margin 8 which is angulated to conform to the forward angle of the automobile windshield 9 to which the windscreen is to be attached, and forming a forward apex 10. Side margins 11 of the sheet 7, beginning at the lateral forward corners 12, are in substantial alignment with the outer sides of the windshield corner posts 13 and sweep rearwardly therefrom, and are turned downwardly at their edges, the flanges 14 so provided tapering in depth from the forward margin 8 towards the rearward margin 15. The rearward margin 15 is preferably straight and is curved upwardly, forming a rim 16. The width of the sheet 7 from the forward margin 8 to the rearward margin 15 is preferably sufficient to dispose the rim 16 above and slightly forwardly of the heads of occupants of the front seat 17.

The sheet 7 is secured to the windshield 9 by pivotal attachment to the corner posts 13 and to a center post 19 which usually is provided in windshields of the V-type or which may be provided and secured to the windshield or dashboard of the automobile. Hinge straps 20 are secured to each of the flanges 14, extending rearwardly from the lateral forward corners 12 of the sheet 7. Cooperating hinge brackets 21 are secured to the corner posts 13, and hinge pins 22 join the straps 20 and brackets 21, defining a pivotal axis for the sheet 7 substantially aligned with the corners 12 and passing rearwardly of the apex 10. Friction washers 23 may be interposed between the straps 20 and brackets 21 to aid in holding the straps at selected angles in relation to the brackets.

Another hinge strap 25 is secured to the central portion of the sheet 7, extending rearwardly from the forward apex 10 to the proximity of the upward curve of the rim 16. A strap 26 is held pivotally pendant from the hinge strap 25 by a hinge pin 27. Secured to the center windshield post 19 is a channel piece 28 in which is set a bolt 29. The strap 26 has a slot 30 in which the bolt 29 is slidably engaged, and the strap itself is slidably guided in the channel piece 28. A wing nut 31 on the bolt 29 serves to clamp the strap 26 in any selected position relative to the windshield 9 permitted by movement of the slot 30 relative to the bolt.

To alter the angle of inclination at which our windscreen extends rearwardly from the windshield 9, the operator loosens the wing nut 31, pulls down or pushes upwardly on either the strap 26 or the rim 16, and tightens the wingnut when a satisfactory adjustment has been made. No corner clamps are required, and the adjusting mechanism is entirely within easy reach from the operator's seat.

It will be observed that the brackets 21 and the channel piece 28 may be attached to the corner and center posts respectively of the windshield at such a level—that is, below the tops of the posts—that they do not interfere with clamping means customarily provided for clamping the automobile top to the posts. Therefore, the automobile top may be freely raised and lowered with our windscreen in place as described. The sheet 7 will extend rearwardly below the automobile top when the latter is in raised position. The sheet 7 will ordinarily be lowered slightly when the automobile top is being raised or lowered, to afford increased accessibility to the top clamping mechanism, and when the top has been clamped to the windshield, the windscreen may be clamped at an angle relative to the top permitting it to be used as a shelf or receptacle for the storage of small articles. The rim 16 prevents articles stored upon the windscreen from falling therefrom, and the transparent sheet 7 affords visibility, thereby rendering the sheet an excellent receptacle for articles such as cigarets or glooves, which may be located thereon visually and retrieved without groping.

When the automobile top is lowered, air flowing over the windshield 9 and around the upper corners thereof is deflected by the windscreen from the occupants of the front seat of the automobile, and largely from occupants of the rear seat, due to deflection of the air upwardly by the curve of the rim 16. The side flanges 14, in addition to their service as hinge supports and as reinforcing elements for the sheet 7, prevent the air from eddying around the upper corners of the windshield, by streamlining a sufficient quantity of air to entrain a larger flow directly rearwardly. The central hinge strap 25 also reinforces the sheet 7 and permits use of lighter material than would be otherwise possible.

Our invention may be subject to various changes without departing from its spirit and scope, and we do not wish to be limited to the exact exemplification herein described and illustrated, but rather to the scope and spirit of the appended claims.

We claim:

1. An overhead windscreen for attachment to a V-type automobile windshield, comprising: a sheet of transparent substantially rigid material formed along its forward margin to conform substantially when in horizontal position to the inner angle of said windshield; downwardly turned flanges on the lateral margins of said sheet; hinge straps secured to said flanges; cooperating hinge means secured to supporting means of said windshield, the pivotal axis defined by said hinge means passing rearwardly of the apex of the forward margin of said sheet; hinge means secured to the apex of the forward margin of said sheet, including a hinge strap pendant from said apex; and means for adjustably holding said last-mentioned hinge strap to vary the inclination of said sheet in relation to said pivotal axis.

2. An overhead windscreen for attachment to a V-type automobile windshield, comprising: a sheet of transparent substantially rigid material formed along its forward margin to conform substantially when in horizontal position to the inner angle of said windshield; downwardly turned flanges on the lateral margins of said sheet; hinge straps secured to said flanges; cooperating hinge means secured to supporting means of said windshield, the pivotal axis defined by said hinge means passing rearwardly of the apex of the forward margin of said sheet; hinge means secured to the apex of the forward margin of said sheet, including a hinge strap pendant from said apex; a slot in said last-mentioned hinge strap; a bolt secured to said windshield engageable slidingly in said slot; and a nut on said bolt for adjustably clamping said last-mentioned hinge strap in relation to said bolt.

3. An overhead windscreen for attachment to a V-type automobile windshield, comprising: a sheet of transparent plastic material angulated along its forward margin to conform substantially when in horizontal position to the inner angle of said windshield and having downwardly turned lateral margins and an upwardly curved rearward margin; reinforcing straps secured to said downwardly turned marginal portions; another reinforcing strap secured to said sheet and extending rearwardly from the apex of said forward margin; hinge connections on the forward ends of all of said straps; means on the lateral margins of said windshield cooperating with the hinge connections of said first-mentioned straps to pivotally support said sheet; and means on the central portion of said windshield engaging the hinge connection of said other strap for holding said sheet at selected inclinations with respect to said windshield.

JAMES L. MATHENY.
RICHARD H. PERKINS.

REFERENCES CITED

The following references are of record in the file of this patent:

UNITED STATES PATENTS

| Number | Name | Date |
| --- | --- | --- |
| 1,442,121 | Brinck | Jan. 16, 1923 |
| 1,448,632 | Luckel | Mar. 13, 1923 |
| 2,043,672 | Morrison | June 9, 1936 |
| 2,334,856 | Atkinson | Nov. 23, 1943 |

FOREIGN PATENTS

| Number | Country | Date |
| --- | --- | --- |
| 21,897 | Great Britain | Sept. 25, 1909 |